United States Patent
Pope et al.

(10) Patent No.: US 10,838,763 B2
(45) Date of Patent: Nov. 17, 2020

(54) NETWORK INTERFACE DEVICE AND HOST PROCESSING DEVICE

(71) Applicant: Xilinx, Inc., San Jose, CA (US)

(72) Inventors: Steven Leslie Pope, Cambridge (GB); David James Riddoch, Fenstanton (GB)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/509,713

(22) Filed: Jul. 12, 2019

(65) Prior Publication Data

US 2020/0026557 A1   Jan. 23, 2020

Related U.S. Application Data

(63) Continuation-in-part of application No. 16/037,873, filed on Jul. 17, 2018, now Pat. No. 10,659,555.

(51) Int. Cl.
  *G06F 15/16* (2006.01)
  *G06F 9/48* (2006.01)
  *G06F 12/0811* (2016.01)
  *G06F 9/38* (2018.01)
  *G06F 12/0842* (2016.01)

(52) U.S. Cl.
  CPC .......... *G06F 9/4881* (2013.01); *G06F 9/3816* (2013.01); *G06F 9/3838* (2013.01); *G06F 12/0811* (2013.01); *G06F 12/0842* (2013.01)

(58) Field of Classification Search
  CPC .... G06F 9/4881; G06F 9/3816; G06F 9/3838; G06F 12/0811; G06F 12/0842
  See application file for complete search history.

(56) References Cited

U.S. PATENT DOCUMENTS

| | | | |
|---|---|---|---|
| 4,905,234 A | 2/1990 | Childress et al. | |
| 5,612,950 A | 3/1997 | Young | |
| 5,937,169 A | 8/1999 | Connery et al. | |
| 6,591,302 B2 | 7/2003 | Boucher et al. | |
| 6,965,941 B2 | 11/2005 | Boucher et al. | |
| 7,032,068 B2 * | 4/2006 | Kuwata ............... | G06F 12/0866 711/113 |

(Continued)

OTHER PUBLICATIONS

Extended European Search Report for European Application No. 18214201.8 dated May 17, 2019.

(Continued)

*Primary Examiner* — Moustafa M Meky
(74) *Attorney, Agent, or Firm* — Wolf, Greenfield & Sacks, P.C.

(57) ABSTRACT

A network interface device has an input configured to receive data from a network. The data is for one of a plurality of different applications. The network interface device also has at least one processor configured to determine which of a plurality of available different caches in a host system the data is to be injected by accessing to a receive queue comprising at least one descriptor indicating a cache location in one of said plurality of caches to which data is to be injected, wherein said at least one descriptor, which indicates the cache location, has an effect on subsequent descriptors of said receive queue until a next descriptor indicates another cache location. The at least one processor is also configured to cause the data to be injected to the cache location in the host system.

21 Claims, 8 Drawing Sheets

S1- Receive data from a network

S2 — determine which cache in a host is to be injected in host system

Inject data into determined cache (56) References Cited

U.S. PATENT DOCUMENTS

| | | | |
|---|---|---|---|
| 7,307,998 B1* | 12/2007 | Wang | H04L 49/90 370/412 |
| 7,620,057 B1 | 11/2009 | Aloni et al. | |
| 7,688,838 B1 | 3/2010 | Aloni et al. | |
| 7,724,740 B1* | 5/2010 | Wang | H04L 12/40013 370/392 |
| 7,818,389 B1* | 10/2010 | Chiang | H01M 4/92 709/212 |
| 7,835,380 B1 | 11/2010 | Aloni et al. | |
| 8,019,825 B1* | 9/2011 | Johnston | H01M 4/92 709/212 |
| 8,032,610 B2 | 10/2011 | Zhu et al. | |
| 8,346,919 B1 | 1/2013 | Eiriksson et al. | |
| 8,358,655 B2* | 1/2013 | Wang | H04L 12/40013 370/392 |
| 8,510,509 B2 | 8/2013 | Gregg et al. | |
| 8,634,431 B1* | 1/2014 | Chiang | H04Q 11/0067 370/249 |
| 8,767,728 B2 | 7/2014 | Mihaly et al. | |
| 8,789,135 B1 | 7/2014 | Pani | |
| 9,256,555 B2* | 2/2016 | Manula | G06F 12/123 |
| 9,336,153 B2 | 5/2016 | Sugimoto et al. | |
| 9,456,060 B2 | 9/2016 | Pope et al. | |
| 9,479,464 B1* | 10/2016 | Wang | H04L 69/22 |
| 9,614,926 B2 | 4/2017 | Gunda et al. | |
| 9,894,176 B2 | 2/2018 | Hudson et al. | |
| 9,992,274 B2 | 6/2018 | Gunda et al. | |
| 10,200,493 B2 | 2/2019 | Bendapudi et al. | |
| 2002/0174240 A1 | 11/2002 | Nason et al. | |
| 2003/0117958 A1 | 6/2003 | Nation et al. | |
| 2003/0149839 A1* | 8/2003 | Kuwata | G06F 12/0866 711/113 |
| 2003/0204602 A1 | 10/2003 | Hudson et al. | |
| 2003/0204613 A1 | 10/2003 | Hudson et al. | |
| 2004/0010712 A1 | 1/2004 | Hui et al. | |
| 2004/0073716 A1 | 4/2004 | Boom et al. | |
| 2005/0010819 A1 | 1/2005 | Williams et al. | |
| 2005/0125694 A1 | 6/2005 | Fakes et al. | |
| 2006/0026679 A1 | 2/2006 | Zakas | |
| 2007/0067497 A1 | 3/2007 | Craft et al. | |
| 2007/0150954 A1 | 6/2007 | Shon | |
| 2007/0209069 A1 | 9/2007 | Saklikar et al. | |
| 2007/0214504 A1 | 9/2007 | Milani Comparetti et al. | |
| 2008/0005776 A1 | 1/2008 | VerSteeg et al. | |
| 2008/0025515 A1 | 1/2008 | Coombs | |
| 2008/0140574 A1 | 6/2008 | Boucher et al. | |
| 2008/0172489 A1 | 7/2008 | Zhu et al. | |
| 2008/0189373 A1 | 8/2008 | Ikonen et al. | |
| 2009/0157977 A1 | 6/2009 | Gregg et al. | |
| 2009/0204813 A1 | 8/2009 | Kwan | |
| 2009/0300281 A1* | 12/2009 | Allen | G06F 3/0674 711/113 |
| 2011/0004771 A1 | 1/2011 | Matsushima et al. | |
| 2011/0119673 A1 | 5/2011 | Bloch et al. | |
| 2012/0224578 A1 | 9/2012 | Mihaly et al. | |
| 2013/0047160 A1 | 2/2013 | Conover | |
| 2013/0054857 A1 | 2/2013 | Horman et al. | |
| 2013/0132503 A1* | 5/2013 | Wang | H04L 49/90 709/213 |
| 2013/0145035 A1 | 6/2013 | Pope et al. | |
| 2013/0173834 A1 | 7/2013 | Glaser et al. | |
| 2014/0181409 A1* | 6/2014 | Manula | G06F 12/123 711/133 |
| 2014/0279342 A1 | 9/2014 | Maynard | |
| 2014/0304802 A1 | 10/2014 | Pope et al. | |
| 2014/0310149 A1 | 10/2014 | Singh | |
| 2015/0032965 A1 | 1/2015 | Sugimoto et al. | |
| 2015/0049763 A1 | 2/2015 | Michels et al. | |
| 2015/0106437 A1 | 4/2015 | Hudson et al. | |
| 2015/0312342 A1 | 10/2015 | Gunda et al. | |
| 2016/0352687 A1 | 12/2016 | Pope et al. | |
| 2016/0373561 A1 | 12/2016 | Pope et al. | |
| 2017/0026497 A1 | 1/2017 | Pope et al. | |
| 2017/0134482 A1 | 5/2017 | Gunda et al. | |
| 2017/0185549 A1 | 6/2017 | Pope | |
| 2017/0214775 A1 | 7/2017 | Pope et al. | |
| 2020/0028930 A1 | 1/2020 | Pope et al. | |

OTHER PUBLICATIONS

Extended European Search Report for European Application No. 19186142.6 dated Dec. 6, 2019.
[No Author Listed], Intel ® Data Direct I/O Technology. Intel. https://www.intel.co.uk/content/www/uk/en/io/data-direct-i-o-technology.html Last accessed Nov. 29, 2018 3 pages.
[No Author Listed], Intel ® Data Direct I/O Technology. Intel. https://web.archive.org/web/20170429020134/https:/www.intel.co.uk/content/www/uk/en/io/data-direct-i-o-technology.html Apr. 29, 2017. Wayback Machine. Last accessed Nov. 9, 2018 4 pages.
[No Author Listed], PCI Express Base Specification Revision 2.1. PCI Express. Mar. 4, 2009:4 pages.
[No Author Listed], Process Address Space ID (PASID). PCI-SIG Engineering Change Notice. PCI SIG. Mar. 31, 2011. 11 pages.
[No Author Listed], TLP Processing Hints. PCI-SIG Engineering Change Notice. PCI SIG. Sep. 11, 2008. 16 pages.
Huggahalli et al., Direct cache access for high bandwidth network I/O. 32nd International Symposium on Computer Architecture (ISCA'05), IEEE. Jun. 4, 2005:10 pages.
Jang et al., Implementation of a Hybrid TCP/IP Offload Engine Prototype. Advances in Computer Systems Architecture Lecture Notes in Computer Science. Springer. 2005;464-77.
U.S. Appl. No 16/037,873, filed Jul. 17, 2018, Pope et al.
EP 18214201.8, May 17, 2019, Extended European Search Report.
EP 19186142.6, Dec. 6, 2019, Extended European Search Report.

* cited by examiner

*Buffer Table*

| Buffer index | Ownership | Physical start address | Length |
|---|---|---|---|
| 1 | 12 | xA000 | x8FF |
| 2 | 8 | xB000 | xFFF |
| 3 | 7 | xC000 | xC1A |
| 4 | 12 | xD000 | xA10 |
| ... | ... | ... | ... |

NETWORK INTERFACE DEVICE AND HOST PROCESSING DEVICE

CROSS REFERENCE TO RELATED APPLICATIONS

This application claims the priority benefit under 35 U.S.C. § 120 as a continuation-in-part of U.S. application Ser. No. 16/037,873, filed Jul. 17, 2018, and titled "NETWORK INTERFACE DEVICE AND HOST PROCESSING DEVICE," the entire contents of which are incorporated herein by reference.

FIELD

Some embodiments relate to a network interface device, to a host processing device and respective methods.

BACKGROUND

Data processing systems may comprise a host computing device or system and a network interface device. The network interface device is configured to provide an interface to a network to allow the host computing device or system to be able to receive data from other host computing devices via the network. The network interface device may be integrated with or separate from the host computing device.

The data which is received may be in the form of data packets. Protocol processing is generally performed on the data packets in order for the host computing device to consume the data in the data packets. The received data may be consumed by an application or application thread which is provided at a user level.

SUMMARY

According to an aspect, there is provided a network interface device comprising: an input configured to receive data from a network, said data being for one of a plurality of different applications; and at least one processor configured to: determine which of a plurality of available different caches in a host system said data is to be injected; and cause said data to be injected to the determined cache in said host system.

At least two of said caches may be associated with different CPU cores.

At least two of said caches may be associated with different physical dies.

The plurality of caches may be arranged according to a topology, said topology defining at least one or more of: relationships between said caches; inclusiveness; association; and a respective size of a cache.

The topology may be defined by a directed acyclic graph DAG structure.

The DAG may be representative of a cache hierarchy.

In some embodiments, the plurality of caches comprises one of more of: a plurality of caches at a same hierarchical level; and a plurality of caches at a different hierarchical level.

The at least one processor may be configured to determine which of said plurality of caches in a host system is to be injected in dependence on the application for which data is received.

The input may be configured to receive data in frames from the network. A frame may comprise data for one or more applications.

The at least one processor may be configured to parse at least one frame to determine one or more applications for which the data in a respective frame is intended.

The at least one processor may be configured to determine which of said plurality of caches in a host system is to be injected in dependence on cache information provided by an application thread of said application.

The cache information may be provided according to its logical or virtual cache topology.

The at least one processor may be configured to use mapping information and said cache information to determine a cache line where data is to be injected.

The logical or virtual cache topology may be combined with the mapping information to provide the physical cache location.

The cache information may be dependent on the topology of said plurality of caches.

The mapping may be provided by a cache hint context.

The mapping may be provided by a buffer table.

A cache hint context may be provided by a descriptor on a per descriptor basis or on a per queue basis.

At least one descriptor may be configured to indicate a cache location as the location to which data is to be injected.

The at least one processor may be configured to determine for an indicated location provided by a respective descriptor, a physical memory location.

The at least one processor may be configured to have access to a receive queue comprising at least one descriptor indicating a cache location to which data is to be injected.

The at least one descriptor indicating a cache location may have an effect on at least one subsequent descriptor which is without an indication of a cache location.

The at least one descriptor indicating a cache location may have an effect on all subsequent descriptors until a next descriptor indicating cache location.

The at least one processor may be configured to determine for an indicated location provided by a respective descriptor, a physical memory location.

An operating system may be configured to update a cache location information store.

The cache location information may be a cache context.

The cache location store may be in the network interface device or in the host system.

The at least one processor configured to determine which of said plurality of caches in a host system is to be injected to may be configured to determine that said cache identified by cache information should not receive said data and to select a cache of said plurality of caches with a larger capacity as said determined cache.

The at least one processor configured to determine which of said plurality of caches in a host system is to be injected may be configured to make a determination that said cache identified by said cache information should not receive said data by determining one or more of the following: an unprocessed quantity of data in said cache identified by said cache information; an unprocessed quantity of data in said cache identified by said cache information by comparing a delivered index of a receive queue and a fill level; and an unprocessed quantity of data in said cache identified by said cache information by comparing a delivered index of a receive queue and an acknowledgement which indicates the processed information. The at least one processor configured to determine which of said plurality of caches in a host system is to be injected may be configured to make a determination that an associated application thread is de-scheduled and said determined cache should not receive said data.

The cache information may comprise default cache information.

The host system may comprise a plurality of computer processor units, at least one of said computer processing units comprising a plurality of cores.

At least two of said computer processor units may be provided on different dies.

The plurality of different caches may comprise at least one of a respective cache for each computer processor unit core of said host system of a first level; and at least one cache shared by at least two of said cores of a second level; and at least one cache shared by all of said cores of a third level.

According to an aspect, there is provided a host device comprising: at least one computer processing unit and a plurality of caches, an application being supported by at least one of said at least one computer processing units, said application being configured to select a cache of the plurality of caches for data received from a network, so that, in use, said data is injected to the determined cache.

At least two of said caches may be associated with different CPU cores.

At least two of said caches may be associated with different physical dies.

The plurality of caches may be arranged according to a topology, said topology defining at least one or more of: relationships between said caches; inclusiveness; association; and a respective size of a cache.

The topology may be defined by a directed acyclic graph structure.

The DAG may be representative of a cache hierarchy.

In some embodiments, the plurality of caches comprises one of more of: a plurality of caches at a same hierarchical level; and a plurality of caches at a different hierarchical level.

An application thread of said application may be configured to select which of said plurality of caches is to be injected. The application thread may be configured to provide cache information.

The cache information may be provided according to its logical or virtual cache topology.

The host device may be configured to provide mapping information which when used with said cache information provides a cache line where data is to be injected.

The logical or virtual cache topology may be combined with the mapping information to provide the physical cache location.

The cache information may be dependent on the topology of said plurality of caches.

The mapping may be provided by a cache hint context.

The mapping may be provided by a buffer table.

A cache hint context may be provided by a descriptor on a per descriptor basis or on a per queue basis.

At least one descriptor may be configured to indicate a cache location as the location to which data is to be injected.

The host device may be configured to determine for an indicated location provided by a respective descriptor, a physical memory location.

The host device may comprise a receive queue comprising at least one descriptor indicating a cache location to which data is to be injected.

The at least one descriptor indicating a cache location may have an effect on at least one subsequent descriptor which is without an indication of a cache location.

The at least one descriptor indicating a cache location may have an effect on all subsequent descriptors until a next descriptor indicating cache location.

An operating system of said host device may be configured to update a cache location information store.

The cache location information may be a cache context.

The cache location store may be in the network interface device or in the host system.

The cache information may comprise default cache information.

At least one of said computer processing units may comprise a plurality of cores.

At least two of said computer processor units may be provided on different dies.

The plurality of different caches may comprise at least one of a respective cache for each computer processor unit core of a first level; and at least one cache shared by at least two of said cores of a second level; and at least one cache shared by all of said cores of a third level.

It should be appreciated that in some embodiments, a system comprising a host device such as previously described may be provided in combination with a network interface device such as previously described.

According to another aspect, there is provided a method comprising: receiving in a network interface device data from a network, said data being for one of a plurality of different applications; determining which of a plurality of available different caches in a host system said data is to be injected; and causing said data to be injected to the determined cache in said host system.

At least two of said caches may be associated with different CPU cores.

At least two of said caches may be associated with different physical dies.

The plurality of caches may be arranged according to a topology, said topology defining at least one or more of: relationships between said caches; inclusiveness; association; and a respective size of a cache.

The topology may be defined by a directed acyclic graph structure.

The DAG may be representative of a cache hierarchy.

In some embodiments, the plurality of caches comprises one of more of: a plurality of caches at a same hierarchical level; and a plurality of caches at a different hierarchical level.

The method may comprise determining which of said plurality of caches in a host system is to be injected in dependence on cache information provided by an application thread of said application.

The cache information may be provided according to its logical or virtual cache topology.

The method may comprise using mapping information and said cache information to determine a cache line where data is to be injected.

The logical or virtual cache topology may be combined with the mapping information to provide the physical cache location.

The cache information may be dependent on the topology of said plurality of caches.

The mapping may be provided by a cache hint context.

The mapping may be provided by a buffer table.

A cache hint context may be provided by a descriptor on a per descriptor basis or on a per queue basis.

At least one descriptor may be configured to indicate a cache location as the location to which data is to be injected.

The method may comprise determining for an indicated location provided by a respective descriptor, a physical memory location.

The method may comprise accessing a receive queue comprising at least one descriptor indicating a cache location to which data is to be injected.

The at least one descriptor indicating a cache location may have an effect on at least one subsequent descriptor which is without an indication of a cache location.

The at least one descriptor indicating a cache location may have an effect on all subsequent descriptors until a next descriptor indicating cache location.

The method may comprise determining for an indicated location provided by a respective descriptor, a physical memory location.

The method may comprise updating a cache location information store.

The cache location information may be a cache context.

The cache location store may be in the network interface device or in the host system.

The method may comprise determining that said cache identified by cache information should not receive said data and to select a cache of said plurality of caches with a larger capacity as said determined cache.

The method may comprise determining an unprocessed quantity of data in said cache identified by said cache information to determine if said cache identified by said cache information should not receive said data.

The method may comprise determining an unprocessed quantity of data in said cache identified by said cache information by comparing a delivered index of a receive queue and a fill level.

The method may comprise determining an unprocessed quantity of data in said cache identified by said cache information by comparing a delivered index of a receive queue and an acknowledgement which indicates the processed information.

The method may comprise determining that an associated application thread is de-scheduled and said determined cache should not receive said data.

The cache information may comprise default cache information.

The host system may comprise a plurality of computer processor units, at least one of said computer processing units comprising a plurality of cores.

At least two of said computer processor units may be provided on different dies.

The plurality of different caches may comprise at least one of a respective cache for each computer processor unit core of said host system of a first level; and at least one cache shared by at least two of said cores of a second level; and at least one cache shared by all of said cores of a third level.

According to another aspect, there is provided a non-transitory computer readable medium encoded with instructions, in which the instructions when executed enable the execution of the steps of: receiving in a network interface device data from a network, said data being for one of a plurality of different applications; determining which of a plurality of available different caches in a host system said data is to be injected; and causing said data to be injected to the determined cache in said host system.

In another aspect a computer program product comprises computer executable code which when run is configured to provide any of the above methods.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Some embodiments will now be described by way of example only with reference to the accompanying drawings, in which.

DETAILED DESCRIPTION OF EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the scope of the present invention. Thus, the present invention is not intended to be limited to the embodiments shown, but is to be accorded the widest scope consistent with the principles and features disclosed herein.

When data is to be transferred between two host processing devices over a data channel provided by a network, each of the host processing devices has a suitable network interface device to allow it to communicate across the channel. The host processing devices and their network interface devices use a protocol to form the data that is transmitted over the channel, so that it can be decoded by a respective receiving host processing device. The data channel may be considered to form part of a network. Additional devices may be connected to the network.

Data may be received at the network interface device at a destination host processing device. The network interface device may be capable of supporting the physical and/or logic requirements of the network protocol. By way of example only, the network protocol may be Ethernet or any other network protocol.

The communication of an application of a host processing device over a network may be facilitated through the use of sockets. A socket may form an end-point for a communication over a network. The management of the sockets, for example determining whether a socket is ready to be processed by an application, may be carried out by the application making system calls to the operating system of the device. The system call may indicate a file descriptor associated with a socket.

System calls to determine whether one or more sockets are ready for processing may return an indication of the sockets that can be processed.

Figure 5:
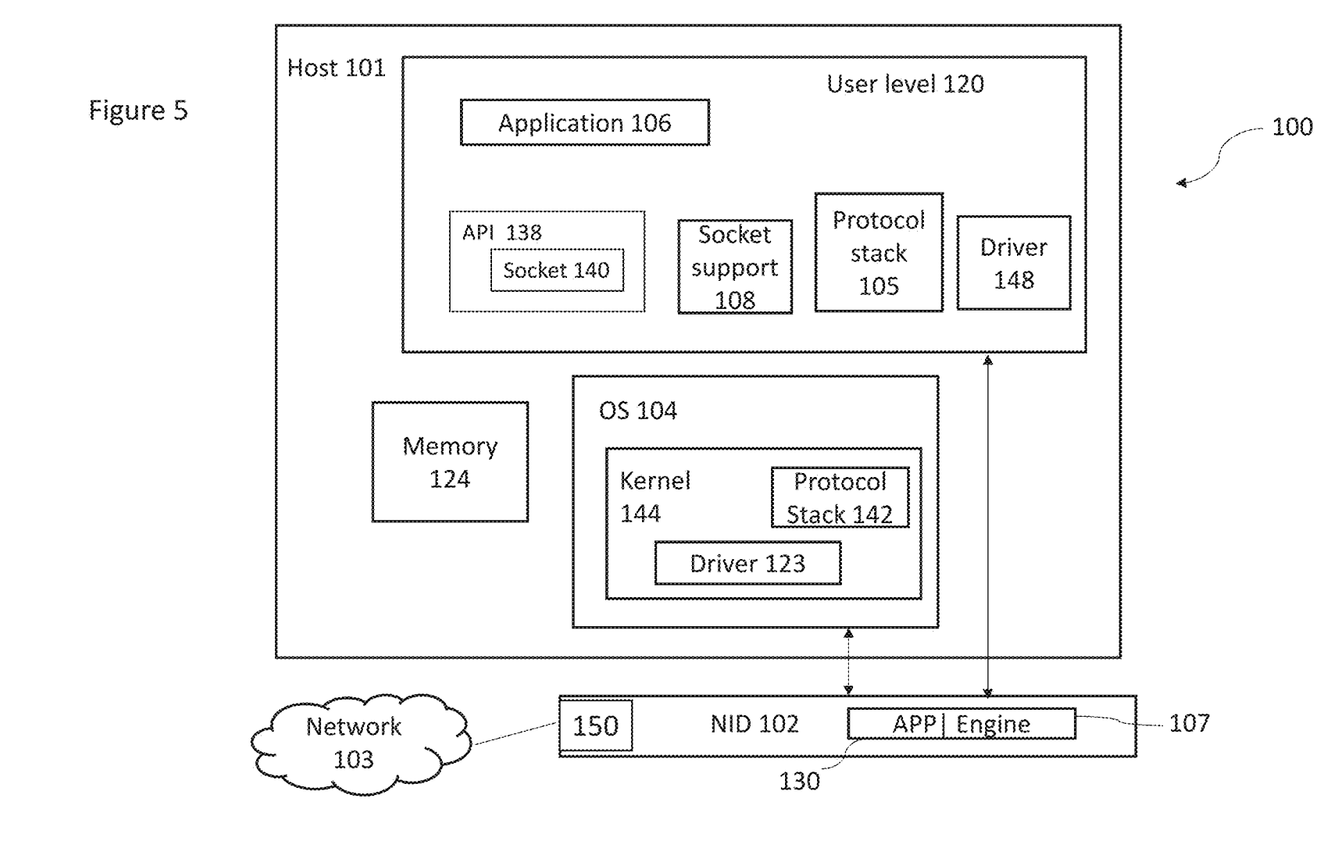
FIG. 5 schematically shows a network interface device and a host computing device.

Reference is made to FIG. 5 which schematically shows a network interface device and a host computing device 101. The network interface device 102 has an interface 150 which allow the network interface device to cause packets to be transmitted onto the network and to receive packets from the network 103. The network interface device has at least one processor 107 or other processing capability. The at least one processor may provide an engine functionality. In some embodiments the at least one processor may comprise one or more of an FPGA (field programmable gate array), an embedded CPU, logic and state machines.

In the arrangement of FIG. 5 the data processing system 100 comprises the host computing device 101 coupled to the network interface device 102 that is arranged to interface the host device to a network 103. The network interface device may or may not be integrated into the host device. The host computing device has a CPU which comprises an operating system OS 104 supporting one or more applications 106. The applications are provided at user level 120. This is at a lower level of privilege than the kernel functions of the operating system. An application programming interface (API) 138 supporting at least one socket 140 associated with the application 106 is provided.

A network protocol stack is provided. The network protocol stack may be provided at the operating system and operate in the kernel context, or it could be a user level protocol stack. In some embodiments, there may be a protocol processing stack both at the user level and the kernel of the operating system. In the example shown in FIG. 5, the network protocol stack referenced 105 is provided at the user level 120 and the protocol stack referenced 142 is provided in the kernel 144 of the operating system 104. In other embodiments, at least a part of the protocol stack functionality may be offloaded to the network interface device.

The user level may comprise a network driver functionality 148 for allowing access to the network interface device 102 which bypasses the OS 104. This may be in the receive and/or transmit direction.

The operating system may be a conventional monolithic operating system, a privileged domain (e.g. a hypervisor) supporting one or more virtualised operating systems, or a virtualised operating system itself. There could therefore be multiple software environments (represented by the entities OS 104, protocol stack 105 and application 106) at the host computing device.

As will be discussed later, some embodiments may be provided by a system or device having two or more CPUs.

The operating system comprises the kernel 144. The kernel may 144 comprise a device driver 123 for the network interface device. The kernel will operate at a higher level of privilege as compared to the applications at the user level.

The data processing system has memory 124. In some embodiments at least some part of the memory may be allocated to the application. In particular at least a part of the memory may provide one or more buffer locations for application data for a respective application.

The user level may comprise a socket support function 108. This socket support function may comprise a file descriptor table indicating a correspondence between a file descriptor and a resource (for example a socket) identified by the file descriptor. This socket support function may comprise an event notification mechanism which monitors events and informs the application when sockets associated with that application are ready to be processed. The event notification mechanism may for example comprise one or more event queues on which notifications corresponding to the placing of data on one or more socket queues may be placed. Some embodiments may make use of buffers, pointers and file descriptors in order to provide data received at the network interface device 102 to the relevant application 106.

In operation, an application such as application 106 wishing to receive network packets over the network may create a port to which network packets may be addressed. Packets addressed to the port number of the port and IP address of the host will be processed by a protocol stack after being received at the network interface device. The port may be bound to a socket which acts as a communication end-point. The socket may be provided with a socket queue which is a queue like data structure into which data for the socket may be placed in order that it may be accessed by an application, process or thread for which the socket is created.

The packets which are received will have a format defined by the appropriate protocols. For example the packets may be in accordance with TCP, the network layer internet protocol (IP) and link layer Ethernet (IEEE 802.3) and thus have a nested set of protocol headers as follows:

[Ethernet [IP [TCP<payload data>] ] ]

where transport layer TCP is carried within an IP packet which is carried within an Ethernet packet. The link (e.g. Ethernet) and network layer (e.g. IP) protocol processing may be performed at the network interface device and/or the host processing device.

There may also be additional protocol layers above the transport layer—for example, middleware messaging or quality of service protocol layers—and these would preferably be handled at the host processing device.

A Layer 2 to 7 (Ethernet) frame may alternatively be encapsulated by Layer 2 to 3 (IP) headers. This allows LANs (local area networks) to be virtualised. Protocols such as VxLAN (virtual extensible LAN) and NVGRE (network virtualization using generic routing encapsulation) achieve this.

It should appreciated that the protocols discussed previously are by way of example only and any other suitable protocol may alternatively be used.

Some embodiments may use a transport stream protocol such as TCP and its payload data represents upper layer protocol messages. Each TCP data packet (or other transport stream packet) includes an identifier of the stream (e.g. IP address and port number) and a sequence number that identifies the position of the packet in the stream sequence. However, different embodiments may use a transport stream protocol other than TCP and/or any other protocol.

In some embodiments a connected socket is created on the host processing device. Thus all the TCP state will be in the host processing device including the transmission control block, in some embodiments.

The application code which is causing the connection to occur is on the host processing device. However optionally in embodiments, a component 130 of the application is provided in the network interface device. For example, the component of the application may be provided by the engine 107. The API can be considered to provide an API between the application components, that is the application supported at the user level and the application part supported by the network interface device.

It should be appreciated that in other embodiments, the application is only provided by the host system at the user level and there is no component of the application supported on the network interface device.

One function of a network interface device is to deliver data from the network to a CPU (which is part of the host device) for processing and receive data from a CPU and deliver onto the network.

Typically the first step in processing data by a CPU is to load a register given the memory address of the data. The accessing of a particular memory address will usually also result in a block of data known as a cache line which encompasses this address to be loaded into a cache which is of close proximity to the CPU. Typically a cache line load will result in a cache line of 64 Bytes (or other suitable size) to be present in a L1 cache—(L1 being commonly accepted as the cache in closest proximity to the core which is processing the data).

In many CPU designs, input/output writes (also called DMA—direct memory accesses) from a device such as a network interface device are delivered to the memory location to which they are addressed. If the same location is cache resident, then the write will cause the cache line to be invalidated so that a subsequent CPU access, such as a thread reading/loading the memory location, will result in a cache load from memory.

Figure 1:
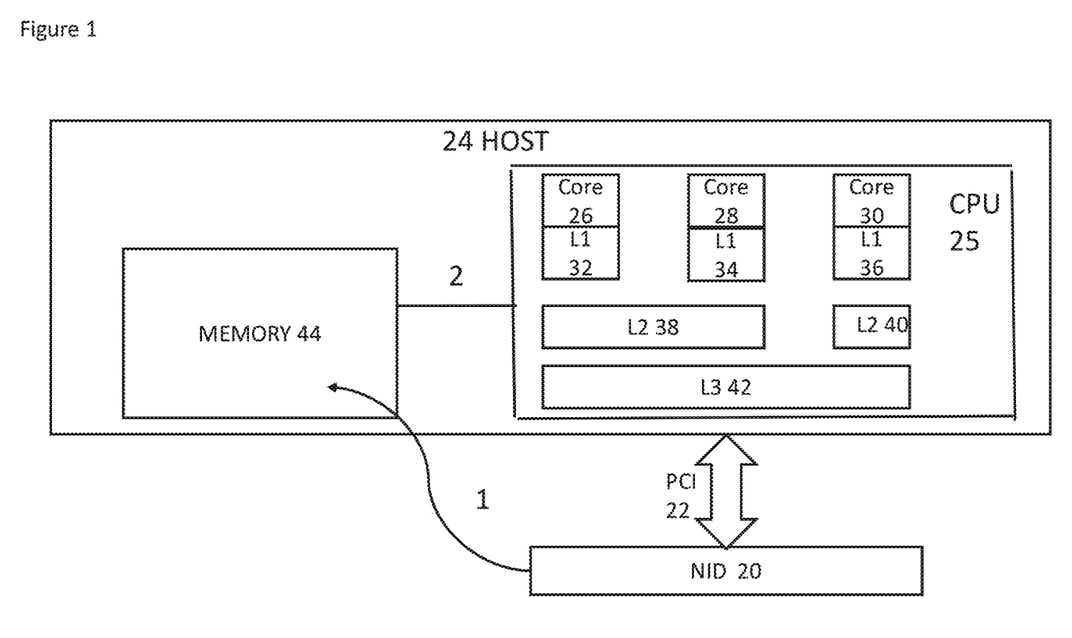
FIG. 1 schematically shows a host device and architecture with a cache arrangement.

Consider the arrangement of FIG. 1 which shows in more detail memory aspects of a host system and network interface device architecture. The arrangement of FIG. 1 may be used in conjunction with the arrangement of FIG. 5. The arrangement of FIG. 1 comprises a network interface device (NID) 20. The network interface device is configured to receive data from a network and to put data onto a network. The NID 20 has a PCI (peripheral component interconnect) connection 22 (or any other suitable bus) with a host system 24. The host system comprises a CPU 25. The CPU is made up of a first core 26, a second core 28 and a third core 30. It should be appreciated that the number of cores shown is by way of example only. There may be two or more cores in some embodiments. The cores may be configured to support one or more applications.

Each core is associated with a respective level one (L1) cache 32, 34 and 36 respectively in the CPU.

There are two level two (L2) caches, 38 and 40. The first 38 of these L2 caches is associated with the first and second cores 26 and 28 whilst the second 40 of these L2 caches is associated with the third core 30.

In this example, the CPU also comprises one level three (L3) cache 42 used by all of the cores 26, 28 and 30.

The host system also comprises a memory 44.

The NID is configured to receive data. That data is written by the NID 20 to memory location X and any caches holding data associated with that memory location X are invalidated. This is represented schematically in FIG. 1 by arrow 1.

As represented by line 2, when an application thread from an application on one of the cores issues a load X instruction, this causes a cache miss. The data from memory location X is then loaded.

This arrangement thus has an increased latency as the data needs to be written to memory and then fetched from memory by the cache before the data can be used. It also results in an increase in memory bandwidth utilisation.

It has been proposed to write the data directly to a L3 cache. However, this approach may be straight forward only if there is one L3 cache (shared by one or more CPUs) or a single CPU and L3 cache.

In particular, it has been proposed to remove the overhead of the cache load. Some architectures cause the write to memory from the NID to be instead a write to the L3 cache. This technique is known as cache injection and is used for example in Intel's™ data direct input/output DDIO.

Depending on the cache design, that data may be immediately committed to the memory or reside only in the cache until a subsequent write back operation. In some embodiments the data is always referred to at a single memory location, but the contents of that location may be cached. The act of "injecting" data into a cache may cause the system to behave as though a cache load from memory had taken place into the "injected" cache.

The CPU will ensure that injected data is available to the system as though the data had been written to its ultimate memory location and had been loaded into the respective cache.

Architecturally all caches may be transparent and there may be one "location" for a particular memory location which is its address in memory.

The arrangement is such that some data is cached in a particular cache, rather than writing it out to its memory location.

Depending on the CPU architecture, there may more than one L3 cache both within the CPU and/or in total over a set of CPUs. The network interface device may be directly connected to a particular CPU, or to a hub which interfaces between a set of two or more CPUs.

Figure 2:
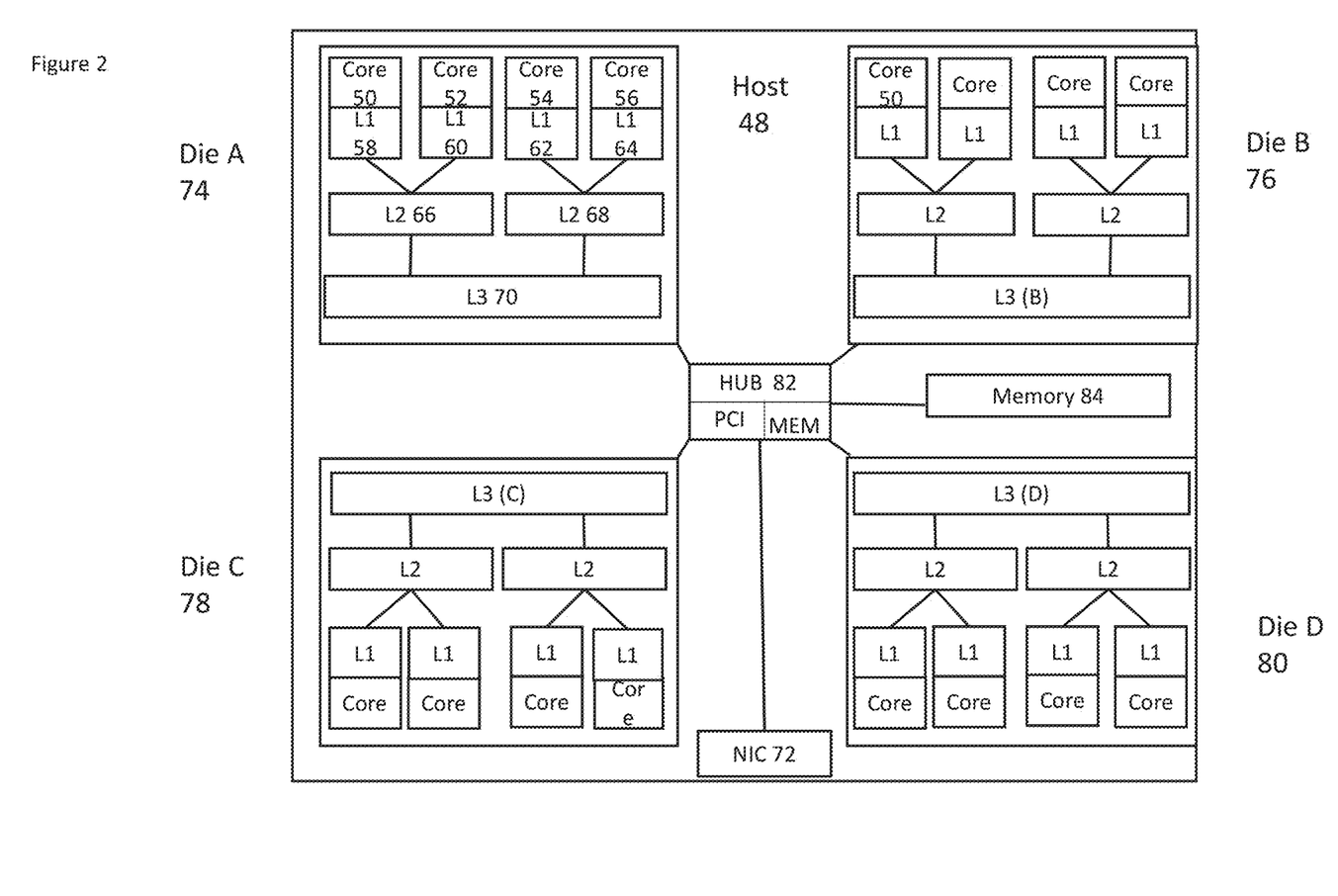
FIG. 2 shows an arrangement where a host device comprises four dies.

In this regard, reference is made to FIG. 2 which shows an example architecture in which some embodiments may be provided. The host system 48 is configured to receive data from a network and put data onto the network via a network interface device 72. It should be appreciate that this architecture may support functionality such as described in relation to FIG. 1 and/or as described in relation to FIG. 5. The application would be supported by a CPU.

The host system comprises four dies 74, 76, 78 and 80 which will be referred to a die A, die B, die C and die D in the following. Each die can be regarded as supporting a CPU. Each die or CPU in this example is provided with four cores 50, 52, 54 and 56. Each core is provided with a respective L1 cache 58, 60, 62 and 64. The first and second cores 50 and 52 share a first L2 cache 66 and the third and fourth cores 54 and 56 share a second L2 cache. A L3 cache is shared by the all four cores.

A common operating system OS functionality is provided which supports all of the CPUs in some embodiments.

In the example shown, each of the four dies has the same architecture. However, this is by way of example only and in other embodiments, the dies may have differing arrangements.

In this example a die or CPU is shown as having four cores. This is by way of example only and a die may have one or more cores. In some embodiments, two or more cores may be provided. A CPU may contain 12 to 24 cores in some embodiments. In other embodiments, more than 24 or less than 12 cores may be provided.

In this example, four dies or CPUs are shown. This is by way of example only and in some embodiments, more than four dies may be provided or less than four dies may be provided. In some embodiments there may be two or more dies or CPUs. In some embodiments, there may be a single die.

The network interface device may be configured to communicate with a hub 82. A memory 84 which is shared by the four dies is provided in the host system.

Alternatively or additionally, some embodiments may attach a memory and/or a PCI to each or two or more (but not necessarily all) of the dies or CPUs. Separate memory may be provided for each die or CPU. In other embodiments, memory may be shared by two or more dies CPUs. A separate PCI may be provided for each die or CPU. In other embodiments a PCI may be shared by two or more dies or CPUs.

A complex CPU implementation such illustrated in FIG. 2 may have issues if a scheme of simply injecting into the connected (by PCI) CPU L3 cache is provided. It may not be clear which L3 cache is the most optimal one to deliver the data since the choice depends upon which core is running the thread which will process the data.

In embodiments, the network interface device is able to steer the data to the cache of the core on CPU on which the respective application thread is running.

In a static system, an application will always run on the same CPU and/or cores and/or all the threads are on the same CPU and/or cores.

An OS scheduler may move a thread from one core to another. This may occur in order to optimize CPU usage. In some embodiments, a thread may be moved from one CPU to another CPU. This may be the case in a dynamic system.

It may be that more than one thread requires access to the data and for these threads to be running on cores with no common cache. For example, these cores may be on different dies in the example of FIG. 2 or may be different cores on the same die which do not share a particular cache level or levels. In this case, a simple cache injection may even be detrimental depending on the access patterns.

In the example of FIG. 2, there are four L3 caches and the correct choice of L3 cache would depend upon which of the 16 cores the receiving thread or threads are running.

In some embodiments, the host 48 may be a SMP (symmetric multiprocessor). Such an architecture has a plurality of processors (CPUs) which share a main memory. All the processors generally have access to all input/output devices. With such an architecture, threads can be scheduled on any core within the SMP. The operating system may not know which of these threads is going to be processing particular data buffers. That may be the usual case in some architectures. The application logic knows which threads are processing particular data buffers as it is the application logic which schedules work amongst its threads.

It should be appreciated that a large system may be provided which comprises two or more SMPs. For example, a single rack scale computer or hyper-converged infrastructure (HCI) may use two or more SMPs.

Some CPU architectures may allow injection into the appropriate L2 or L1 cache which given an architecture such as shown in FIG. 2 may lead to a choice of a plethora of caches to deliver to.

It may be the case that caches get smaller as they get "closer" to the CPU. By way of example only, a CPU might have a 64 KB L1 cache, a 256 KB L2 cache, and a 2 MB L3 cache sizes. These sizes are for illustrative purposes and it should be appreciated that different implementations may have different sizes of cache.

This reduced cache size has implications for a network interface device which is streaming at high bandwidths. For example a 25 Gb/s network interface device writing to a given L2 cache will completely fill the cache in 80 µs if it has a 256 KB capacity. If the thread is not scheduled or doing other processing at the time data arrives, it is likely that a burst of injected data would completely fill the cache. If this happened then new data arriving would cause old data, including previously injected data to be written back to memory. Since a thread normally processes data in order of delivery, when the thread finally gets to the data another cache load would be required. Such cache thrashing can be detrimental to performance.

In some embodiments, a dynamic control of the cache destination is provided. It has been proposed to allow the network interface device to direct appropriately for the interrupt handlers which are associated with the device.

The PCI standard allows for two settings. (i) TPH (transport layer packet processing hint) which provides a bit which if set causes cache injection to be attempted (ii) a steering tag, which is a value interpreted by the CPU to determine a particular cache to inject.

However the thread, which may be executing in usermode or at the user level, perhaps with a privileged OS and hypervisor, is not itself entitled to set steering tags. If such a thread was entitled, then the thread could cause performance issues for other threads through inappropriate cache steering.

The network interface device or host device may hold a translation from the logical cache hierarchy as seen by the application thread to the physical cache hierarchy.

In some embodiments there is a table or other mechanism which translates virtual memory locations to bus physical locations.

In some embodiments, the network interface device is informed as to which cache to deliver data on a per-thread basis, these threads being application or user-level threads.

The location to which data is written is not changed. Rather the cache hint or cache steering tag selects whether the data is cached in a particular cache. This tag can be considered as "meta-data" which can be included in a DMA transaction such as over a PCI Express bus or other suitable bus.

For all buffers which are accessible by an application and entitled to be a DMA (direct memory access) destination, the privileged software (OS) programs the network interface device with a translation mapping. These buffers may be provided by the memory. Each buffer is further associated (on the network interface device) with a cache topology context.

The context is an array of N steering tags to be used for a given buffer.

When an application thread posts a receive description on a descriptor ring on the network interface device, it can select a cache [N] from its cache context. It can also select a default cache and change this by posting an "option" descriptor onto the descriptor ring. The option descriptor also acts as a point of ordering network interface device behaviour relative to descriptor operations, that is to indicate a behaviour or context change relative to descriptors posted before the "option" descriptor and those posted after the "option" descriptor. In other words, the "option" descriptor can be used to control where the data is written into memory in successive write operations. That option will apply for subsequent descriptors until the next "option" descriptor is received.

Figure 3A:
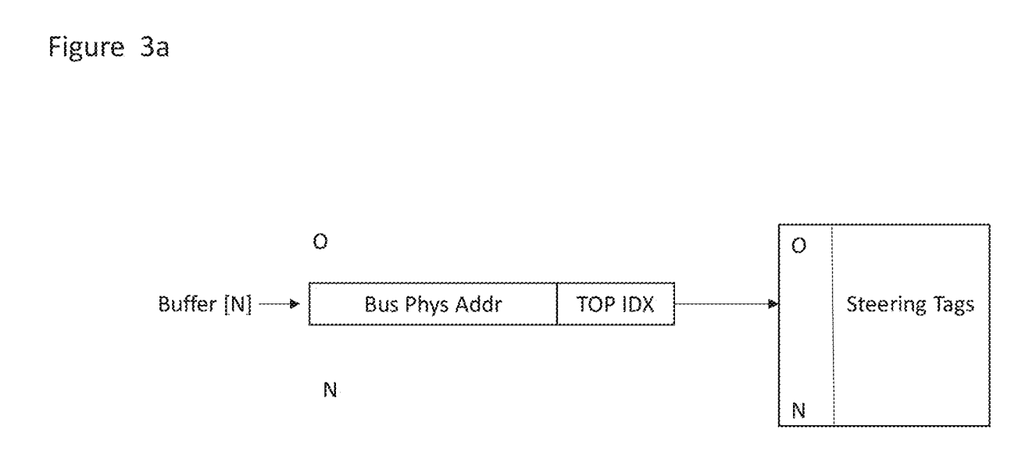
FIG. 3a shows the mapping of a virtual address of a buffer onto a bus physical address.

FIG. 3a shows the mapping of a virtual address of a buffer as referenced in a DMA descriptor onto the bus physical address (Bus Phys Addr) to be used by the NID for the DMA operation. A further mapping (TOP IDX—topology index) is provided which enables a DMA descriptor to reference a number of cache steering tags to be included in the bus transactions used for DMA operations on the buffer (memory region).

As shown there is a per buffer logical steering tag index. In other embodiments, this could be provided on a per queue-pair (or VNIC (virtual NIC), virtual interface, virtual or physical function) basis.

The logical values O=N would be understood by the thread as its available set of caches. Each cache may be associated with its own logical value.

Thus as a thread is executing, it may select different logical caches to inject. The logical cache values may be chosen to numerically match those presented by the operating system to the application according to a defined topology.

The OS can change the physical set, as a result of scheduling decisions by updating the context. This will have the effect of updating the buffer table, described in more detail later. The application thread may thus post a receive descriptor which will define a cache where the application wants its data injected. This may for example be to a particular cache or to a particular memory. This is a hint to the host that some data should be cached in a particular cache, rather than writing it out to its memory location. Architecturally all caches are transparent and there is one "location" for a particular memory location which is its address in memory.

The network interface device will use a mapping to determine the physical memory location associated with the indicated memory location. The mapping may be provided as a buffer table.

The mapping may be implemented as a private address mapping relative to the context of a descriptor queue, or as a shared data structure for example a system page table or an address translation cache (for example as part of a PCI ATS (address translation service) implementation).

The application may post a descriptor onto the descriptor ring which indicates that the data is to be injected to the L2 cache. The network interface device will use the buffer table to determine the physical location of the L2 cache and cause the received data to be injected to the physical location of the L2 cache. When the network interface device has injected to the physical location of the L2 cache, the event queue of the associated socket may be updated as well as the write pointer in the receive ring used by the network interface device. The network interface device may write or inject the next received data to the next location indicated by the update write pointer in the receive ring or queue.

In some embodiments, each descriptor can supply a different cache hint. In other embodiments, an option descriptor (which is a command) may change the cache hint for all subsequent descriptors until the next option descriptor is received.

For example, a RX DMA queue (RX Q) is pushed with descriptors indicating that data should be written to memory locations A-F by pushing the following descriptors onto the RX Queue:
STEER TAG 1 (option descriptor)
A
B
C
STEER TAG 2 (option descriptor)
D
E
F This would result in the hardware mapping the STEER TAG1 onto a physical steering tag according to the RX Qs cache context and using the steering tag as metadata during DMA operations on buffers A-C and then to use the physical steering tag mapped to logical STEER TAG2 for buffers D-F.

The option descriptor may have an effect on all subsequent descriptors posted to the queue until another option descriptor has been processed.

The network interface device firmware itself can estimate the amount of unprocessed data which has been delivered and adjust the steering tags accordingly.

For example, if the network interface device has been requested to steer to a higher cache (i.e. closer to the core) in the hierarchy and the network interface device detects that unprocessed data is building up, then it may switch to a lower level cache, or even switch to no cache injection (deliver to memory). This might occur where the application is falling behind so the data is written to memory to avoid the overwriting of data in the cache before it has been used. The network interface device may normally write to L2 cache but may change to L3 or memory if the application falling behind.

To do this the network interface device detects the difference between indexes in the receive descriptor ring and computes the difference between the delivered index and the fill level (or an explicit processing acknowledgement index or other suitable acknowledgement.). The acknowledgement may be written by the application thread which processes the data, or by the thread (application thread or operating system thread) which processes the descriptor ring.

If the difference is lower than a threshold, then the network interface device will change the location to which the network interface device is writing to. It should be appreciated that in some embodiments, the network interface device may use different thresholds for different caches. For example the threshold may be smaller for a higher level cache as compared to a lower level cache or vice versa. In other embodiments the threshold may be the same for all the caches.

In some embodiments, the cache context is expressed as a topology where the relationships between caches is defined. One example of such a topology is a connected data structure. The connected data structure may be a DAG (directed acyclic graph) where the relationship between caches is defined. This structure may contain the size of each cache and/or one or more other cache properties. For example one cache property of a particular cache type may be whether it is an inclusive cache.

The expressing of the cache context as a topology may be used in those embodiments which use one or more thresholds to determine if which of a hierarchy of caches is to be used.

In some embodiments, the cache context may be a property of a DMQ queue or a VNIC or a PCI function. The context may contain a DAG which confers a topology which is representative of a cache hierarchy. The topology may contain attributes of caches in a CPU. The attributes may comprise one or more of size and other properties such as inclusiveness, association and/or the like. Context may be provided in a local memory on the network interface device. The context may be updated by the operation system. This may be via an update message, for example.

The context may alternatively or additionally be held in the CPU. The context may be stored either in host memory or a dedicated location. In this embodiment, the network interface device may be configured to read that context stored in the host.

Figure 4:
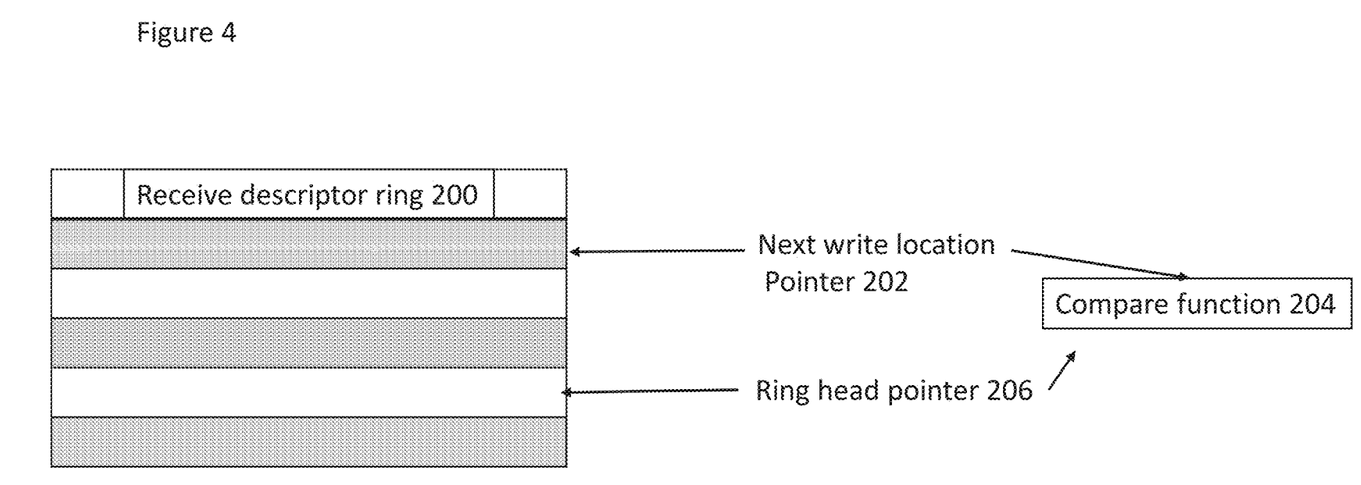
FIG. 4 schematically shows a receive descriptor ring.

Reference is made to FIG. 4 which schematically shows a receive descriptor ring 200 which may be stored in the memory. The NID has a compare function 204 which compares the write pointer 202 of the descriptor ring with the ring head pointer 202. The NID will have access to the write pointer and will be update the pointer when data is written to the buffer or cache.

If the network interface device is balancing between caches then the cache context data structure may encode the cache hierarchy rather than be a simple list as shown i.e. a tree like data structure. For example, the network interface device is configured to write to the highest available cache. Thus if the L1 cache is available then the network interface device is configured to write to that location but if not, the network interface device will write to the L2 location etc. It should be appreciated that in other embodiments, different options may be encoded.

Figure 3B:
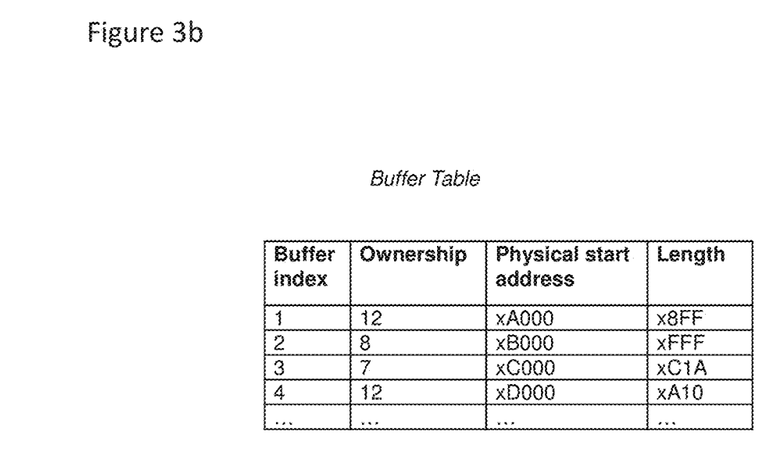
FIG. 3b shows a buffer table used to determine a physical location of a buffer.

In some embodiments, the network interface device is provided with or has access to a buffer table. When the NID has the location from the descriptor table of the buffer location, the buffer table as shown in FIG. 3b is used to determine the physical location of the buffer. The buffer table maps which of the threads or applications is allocated to each buffer and holds the following information for each buffer:

1. Buffer index. This is an identifying number for the buffer, which, is unique for the host. The buffer is identified by this number in the buffer table index field.

2. Ownership. This indicates which application or thread owns the buffer.

3. Physical memory address. The buffer occupies a contiguous block of physical memory, and this number indicates where that block starts.

4. Length. This indicates the length of the buffer in memory.

The size of each buffer table entry may be chosen to match the page size of the host system: typically 4 KBytes. In that way a contiguous region of the application's virtual address space which is mapped onto a non-contiguous region of physical memory can be represented by a sequence of buffer table entries.

Thus, in some embodiments, the application provides cache information (hints) according to its logical (or virtual) cache topology. This is combined with a mapping held by the NID of this logical topology onto the physical cache hints.

Embodiments may use a buffer table and/or a cache hint context which is associated with another entity such as a queue or VNIC or the like to provide a mapping of the logical to the physical cache hierarchy. In some embodiments, the OS or privileged software may be configured to change the mapping.

In some embodiments, it may be determined that the application thread is de-scheduled. This may be determined by the operating system scheduler. In this scenario the data may be not injected to the indicated cache and may be injected into a larger cache or simply written to memory.

In the above example, the mapping of the indicated memory to the physical memory location is performed by the network interface device based on for example a mapping table or the like stored on the network interface device.

In some embodiments, the network interface device may use a mapping table or the like stored on the host system.

In some embodiments, the mapping may be performed on the host side. In one such embodiment, the memory mapping be entirely made on the host side of the PCI bus. This may for example be done by an IOMMU (input/output memory management unit) or any other suitable function. Using an IOMMU the NID is not required to perform address translation and so may not be required to maintain a structure such as the previously described buffer table.

The cache context translation may be performed by the IOMMU. All the same data structures and semantics would be possible for the cases where the cache injection hint is linked to the buffer. For example, the IOMMU may hold a per-ring context and support the option descriptors previously described.

The network interface device may "write" data to the address in the descriptor ring. That write transaction is received by the IOMMU and then written to the physical location associated with the address in the descriptor ring.

There may be no requirement to have steering tags embedded in the bus transaction (which could make the transaction perhaps more efficient). However in some embodiments steering tags which are analogous to the TLP steering tags may be used.

In some embodiments, the cache context function may be implemented on the network interface device or the IOMMU regardless as to where the address translation takes place.

Figure 6:
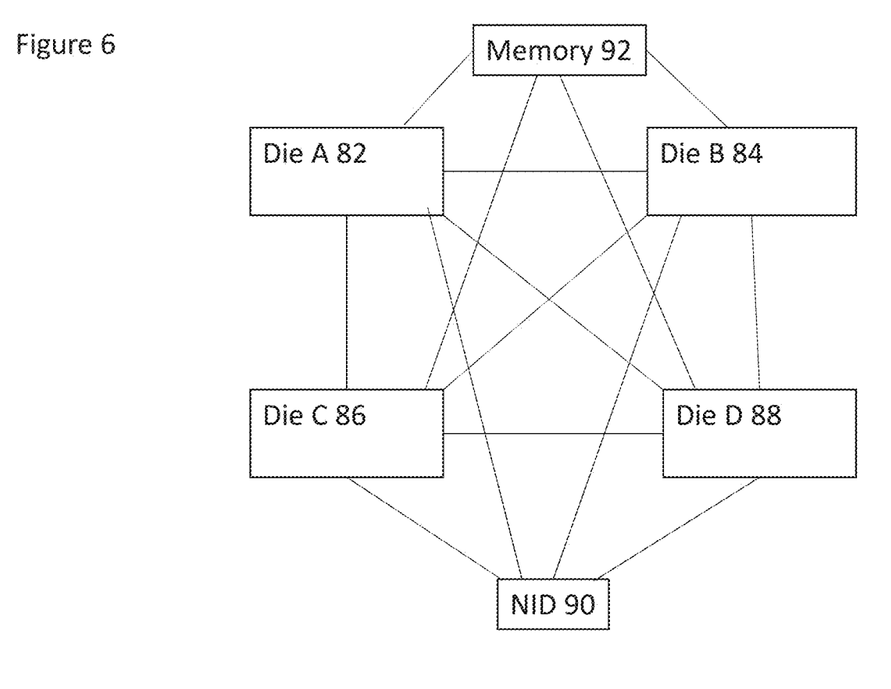
FIG. 6 shows an arrangement comprising four dies in relation to a network interface device and memory.

In other embodiments, the hub may be integrated with one, some or all of the CPU dies. In such embodiments, the network interface device and memory may be connected directly to one or more of the CPU dies. Such an example embodiment is shown in FIG. 6. In the example, there are four dies, die A 82, die B 84, die C 86 and die D 88. Each die is connected to each other, to the memory 92 and to the network interface device 90. Each of the CPUs, the memory and the NID may function broadly as previously described.

In the previously described embodiments, the CPU groups are described as being on separate physical dies. It should be appreciated that some embodiments may be used where the CPU groups are provided on other physical entities. In other embodiments, there may be advantages in using the described techniques where the CPU groups are provided on one or more shared physical entities.

In the previously described embodiments, the CPUs and the associated caches are provided in the host device. It should be appreciated that in some embodiments one or more CPU groups with their associated caches may be provided on the network interface device itself. For example, one or more CPU groups may be provided on the network interface device and one or more CPU groups may be provided on the host device. In some embodiments, the cache injection mechanism may be applied to two or more CPU groups on the network interface device.

Figure 7:
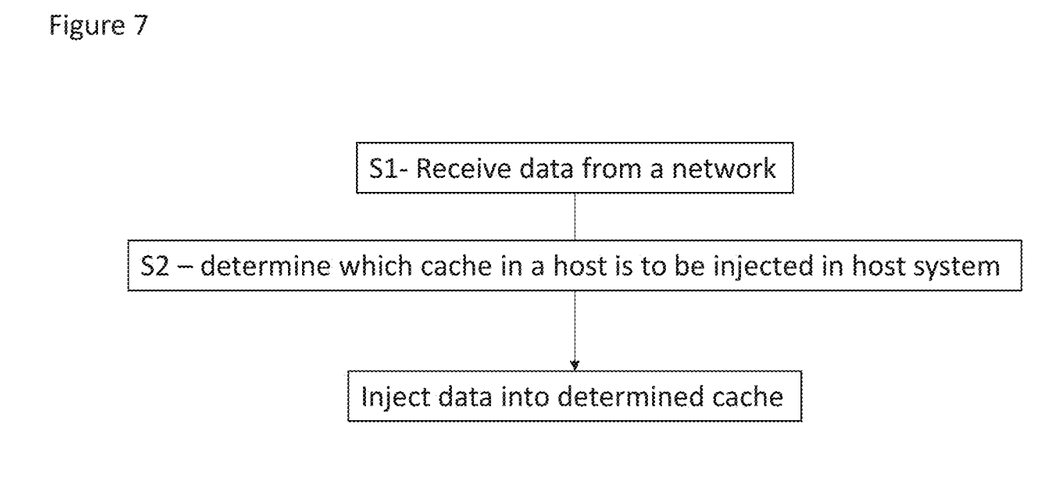
FIG. 7 shows an example method flow.

A method will now be described in relation to FIG. 7. In step S1, data is received from a network at the network interface device. The data may be for one of a plurality of different applications. In some embodiments, the data is received in frames such as previously described. The network interface device may parse the frames to determine the application for which the data is intended. In some embodiments, a frame may contain data for more than one application. In some embodiments, a frame may only contain data for one application.

In step S2, it is determined which of a plurality of available different caches in a host system the data is to be injected to.

If a frame contains data for more than one application, the data from the same frame may need to be directed to two different caches.

In some embodiments, where a frame contains data for one application, part of the data may be processed on one CPU and part of the data may be processed by another CPU. For example one CPU may do header processing such as TCP processing and one CPU may do payload processing. In such a case, only part of the data from the frame may be injected to a cache. The other part of the data from the frame may be for example processed on the network interface device. Alternatively different parts of the data from the frame may be injected to different caches.

In some embodiments, one or more caches may be shared by two or more applications. In that case, the data from different application may be injected into the same cache or different levels of caches in the cache hierarchy.

In step S3, the data is caused to be injected to the determined cache in said host system.

The steps of the method may be performed in the network interface device.

A host computing or processing device or system may be any suitable computing device or system. By way of example, the host computing device may comprise one or more of a server, a personal computer, a switch, a router, a bridge, a virtualised system (e.g. a virtualised operating system and the applications it supports), a portable device such as a tablet computer or smartphone or any other suitable computing device. In some embodiments the host device may be provided by a set of two or more computing devices. These computing devices may be the same or different. These computing devices may be any one or more of the previous examples of computing devices.

The network interface device may be any hardware device configured to interface a wired or wireless network to a host computing device. The network interface device could be provided in any manner between a network and host device. The network interface device may be an integral part of the host processing device. The physical hardware components of the network interfaces are sometimes referred to network interface cards (NICs) although they need not be in the form of cards. For example, they could be in the form of integrated circuits (ICs) and connectors fitted directly onto a motherboard. The network interface device may be provided by a LAN (local area network) or LOM (LAN on motherboard). The network interface device may alternatively or additionally be provided as one or more peripheral devices such as a PCIe card of the host computing device. It should be appreciated that in other embodiments, any other suitable network interface device may be used.

The network interface device may be implemented by at least one processor and at least one memory. The embodiments may be implemented by computer software executable by a data processor, such as in a processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), as non-limiting examples.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A network interface device comprising:
   an input configured to receive data from a network, said data being for one of a plurality of different applications; and
   at least one processor configured to:
   determine to which of a plurality of available different caches in a host system said data is to be injected by accessing a receive queue comprising at least one descriptor indicating a cache location in one of said plurality of caches to which data is to be injected, wherein said at least one descriptor, which indicates the cache location, has an effect on subsequent descriptors of said receive queue until a next descriptor indicates another cache location; and
   cause said data to be injected to the cache location in said host system.

2. The network interface device as claimed in claim 1, wherein at least two of said plurality of caches are associated with different CPU cores and/or different physical dies.

3. The network interface device as claimed in claim 1, wherein said at least one processor is configured to determine which of said plurality of caches in a host system is to be injected in dependence on cache information provided by an application thread of said application.

4. The network interface device as claimed in claim 3, wherein said at least one processor is configured to use mapping information and said cache information to determine a cache line where data is to be injected.

5. The network interface device as claimed in claim 4, wherein said mapping is provided by a cache hint context.

6. The network interface device as claimed in claim 3, wherein the cache information is dependent on the topology of said plurality of caches.

7. The network interface device as claimed in claim 3, wherein said at least one processor configured to determine to which of said plurality of caches in a host system said data is to be injected is configured to determine that said cache identified by cache information should not receive said data and to select a cache of said plurality of caches with a larger capacity than said determined cache.

8. The network interface device as claimed in claim 7, wherein said at least one processor configured to determine to which of said plurality of caches in a host system said data is to be injected is configured to make a determination that said cache identified by said cache information should not receive said data by determining one or more of the following:
- an unprocessed quantity of data in said cache identified by said cache information;
- an unprocessed quantity of data in said cache identified by said cache information by comparing a delivered index of a receive queue and a fill level; or
- an unprocessed quantity of data in said cache identified by said cache information by comparing a delivered index of a receive queue and an acknowledgement which indicates processed information.

9. The network interface device as claimed in claim 1, wherein said at least one processor is configured to determine for an indicated location provided by a respective descriptor, a physical memory location.

10. The network interface device as claimed in claim 1, wherein said at least one processor configured to determine to which of said plurality of caches in a host system said data is to be injected is configured to make a determination that an associated application thread is de-scheduled and said determined cache should not receive said data.

11. A method performed in network interface device comprising:
- receiving data from a network, said data being for one of a plurality of different applications;
- determining to which of a plurality of available different caches in a host system said data is to be injected by accessing a receive queue comprising at least one descriptor indicating a cache location in one of said plurality of caches to which data is to be injected, wherein said at least one descriptor, which indicates the cache location, has an effect on subsequent descriptors of said receive queue until a next descriptor indicates another cache location; and
- causing said data to be injected to the determined cache in said host system.

12. The method as claimed in claim 11, wherein at least two of said plurality of caches are associated with different CPU cores and/or different physical dies.

13. The method as claimed in claim 11, comprising determining to which of said plurality of caches in a host system said data is to be injected in dependence on cache information provided by an application thread of said application.

14. The method as claimed in claim 13, comprising using mapping information and said cache information to determine a cache line where data is to be injected.

15. The method as claimed in claim 14, wherein said mapping is provided by a cache hint context.

16. The method as claimed in claim 13, wherein the cache information is dependent on the topology of said plurality of caches.

17. The method as claimed in claim 13, wherein the determining to which of said plurality of caches in a host system said data is to be injected comprises determining that said cache identified by cache information should not receive said data and to select a cache of said plurality of caches with a larger capacity than said determined cache.

18. The method as claimed in claim 17, wherein the determining to which of said plurality of caches in a host system said data is to be injected comprises making a determination that said cache identified by said cache information should not receive said data by determining one or more of the following:
- an unprocessed quantity of data in said cache identified by said cache information;
- an unprocessed quantity of data in said cache identified by said cache information by comparing a delivered index of a receive queue and a fill level; or
- an unprocessed quantity of data in said cache identified by said cache information by comparing a delivered index of a receive queue and an acknowledgement which indicates processed information.

19. The method as claimed in claim 11, comprising determining for an indicated location provided by a respective descriptor, a physical memory location.

20. The method as claimed in claim 11, wherein the determining to which of said plurality of caches in a host system said data is to be injected comprises making a determination that an associated application thread is de-scheduled and said determined cache should not receive said data.

21. A non-transitory computer readable medium encoded with instructions, in which the instructions when executed enable the execution of the steps of:
- receiving data from a network, said data being for one of a plurality of different applications;
- determining to which of a plurality of available different caches in a host system said data is to be injected by accessing a receive queue comprising at least one descriptor indicating a cache location in one of said plurality of caches to which data is to be injected, wherein said at least one descriptor, which indicates the cache location, has an effect on subsequent descriptors of said receive queue until a next descriptor indicates another cache location; and
- causing said data to be injected to the determined cache in said host system.

* * * * *